US012459790B1

(12) United States Patent
Weddel

(10) Patent No.: US 12,459,790 B1
(45) Date of Patent: Nov. 4, 2025

(54) OVERHEAD CRANE AND BOOM

(71) Applicant: Lee Weddel, Linden, MI (US)

(72) Inventor: Lee Weddel, Linden, MI (US)

( * ) Notice: Subject to any disclaimer, the term of this patent is extended or adjusted under 35 U.S.C. 154(b) by 278 days.

(21) Appl. No.: 18/237,258

(22) Filed: Aug. 23, 2023

(51) Int. Cl.
*B66C 17/04* (2006.01)
*B66C 23/70* (2006.01)

(52) U.S. Cl.
CPC ............ *B66C 23/703* (2013.01); *B66C 17/04* (2013.01)

(58) Field of Classification Search
CPC ....... B66C 17/04; B66C 17/00; B66C 23/703; B66C 23/706; B66C 11/10; B66C 11/08
See application file for complete search history.

(56) References Cited

U.S. PATENT DOCUMENTS 508,476 A * 11/1893 Horton .................... B66C 11/10 212/317
8,181,799 B2 * 5/2012 Laliberte ................ B66C 13/30 212/320
10,793,399 B2 * 10/2020 Lawrence ............... B66C 17/00
2019/0263637 A1 * 8/2019 Lawrence ............... B66C 11/10
2019/0299834 A1 * 10/2019 Havas .................. B60P 1/5495

* cited by examiner

*Primary Examiner* — Anna M Momper
*Assistant Examiner* — Juan J Campos, Jr.
(74) *Attorney, Agent, or Firm* — Laurence C. Begin

(57) ABSTRACT

A crane assembly containing a boom for an overhead crane and trolley contains an arm having a first vertical portion and an outer surface, the arm fixed to the crane for upper and lower movement of the arm, and the arm containing a second portion angularly extending from the vertical portion. An outer sleeve surrounds and is fixed to the vertical portion, wherein the outer sleeve is fixed to the trolley and extends about the arm thereby defining a plenum between the outer sleeve and the inner vertical arm. During operation, the arm is adapted to be vertically moved within said outer sleeve. A support beam is fixed to the trolley, and is hingedly connected to the outer sleeve. A drive assembly is connected to the outer sleeve for rotating the boom about the support beam.

20 Claims, 10 Drawing Sheets

OVERHEAD CRANE AND BOOM

BACKGROUND OF THE INVENTION

In many industrial areas, there is a need to move crates of parts, products, and/or materials necessary for the manufacturing or warehousing of various parts and/or products. Oftentimes, such facilities must employ one or more fork-lift drivers depending on the size of the facility, expending capital and labor in the process.

Another challenge, in moving parts from a truck or loading vessel to a point in a manufacturing or warehouse facility, is the ability for the worker to move parts from any point in a trailer or loading vessel backed up to the loading dock of the facility. Again, a fork-lift driver typically may need to unload the rear of the truck to reach packages or crates that are positioned toward the front of the truck and meant for unloading at the respective location. Remediating the need to unload the truck to access packages in the front of the truck, would be an improvement in the art and related processes.

Oftentimes, when crates and heavy objects must be moved, a facility may have one or more overhead cranes or systems installed for moving the crates around vis a vis a trolley that moves along a set of tracks defined by the type of overhead system that is installed. The crane may be rated for a certain mass such as 2-ton, 5-ton, 7.5-ton, 10-ton, 15-ton, 20-ton, and so forth. Yet further, the crane may be adjusted to limit the upper and lower vertical position of the hoist assembly at the end of the chain or steel cable of the crane, thereby limiting how high or how low a particular payload or crate can be moved in a vertical position. The one shortcoming of this system is that there has not yet been an adaptation or modification that permits the use of this crane system directly from the inside of a truck or vessel at the loading dock. Adapting the typical overhead cranes to contain an auxiliary crane system or boom assembly that can reach into a truck or vessel on a loading dock would therefore also be an improvement in the art.

SUMMARY OF THE INVENTION

Responsive to the challenges identified above, a crane assembly contains a boom for an overhead crane and trolley. The boom contains an arm having a first vertical portion and an outer surface, wherein the arm is fixed to the crane for upper and lower movement of the arm, and the arm contains a second portion angularly extending from the vertical portion. An outer sleeve surrounds and is fixed to the vertical portion, wherein the outer sleeve is attached to a hinge system which is connected to a support column. The support column is welded or otherwise fixed to the trolley, with gussets welded from the trolley to the support column as well. The outer sleeve extends about the arm thereby defining a plenum between the outer sleeve and the inner vertical arm. During operation, and in accordance with the present invention, the arm is thereby adapted to be vertically moved within the outer sleeve. A support beam is fixed to the trolley, and is hingedly connected to the outer sleeve. A drive assembly is connected to the outer sleeve for rotating the boom about the support beam.

REFERENCE NUMBERS

Figure 1:
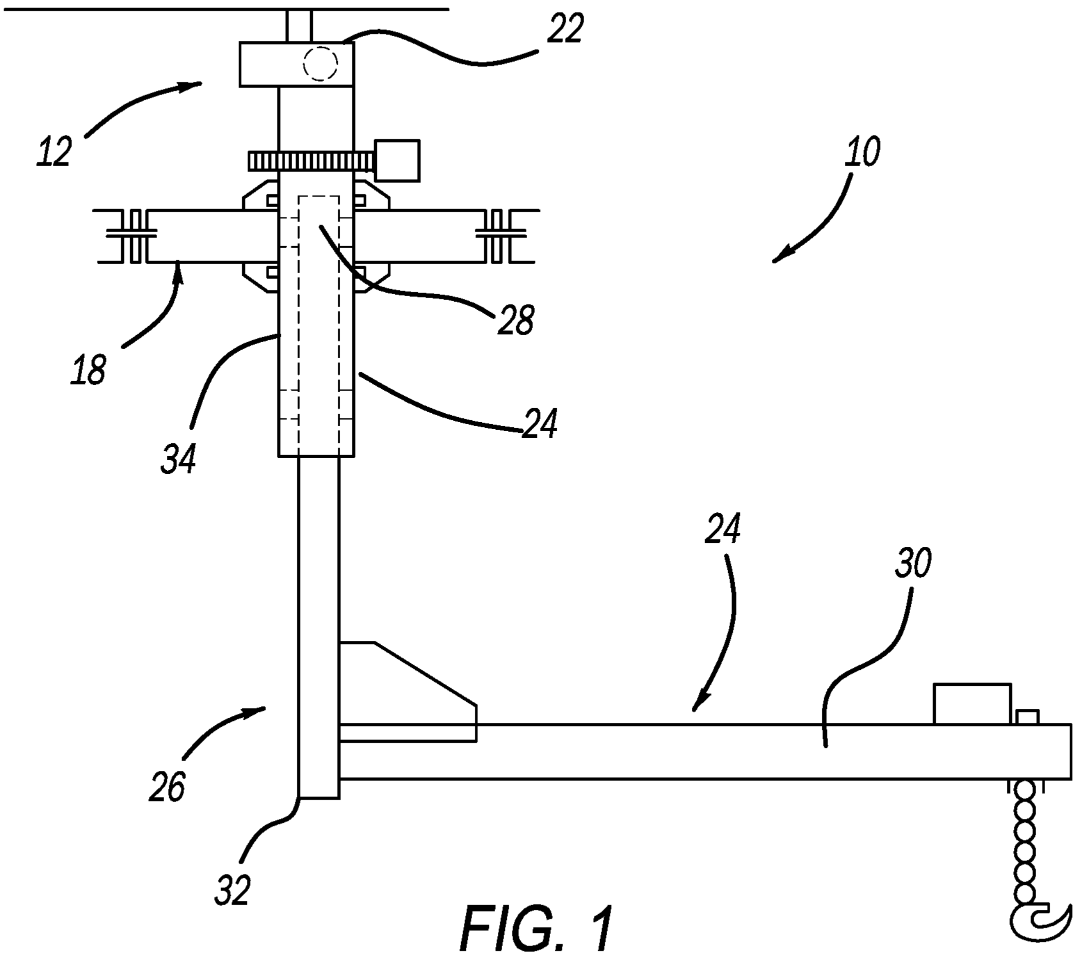
FIG. 1 is a side view of an overhead crane, trolley, and boom assembly of the present invention.

Crane system 10
Hoist 12
Bridge 15
Truck 16
Trolley 18
Support gussets 19
Track/crane rail 20
First chain and hoist assembly 22
Boom or arm assembly 24
Vertical inner arm 26
First end of vertical inner arm 28
Horizontal arm 30
First horizontal tube 31
Second end of vertical inner arm 32
Second horizontal tube 33
Outer sleeve 34
Reinforcing plate 35
Upper orifice 36
First closed end of the horizontal arm 37
Inner wall of the outer sleeve 38
First vertical slot 40
Second vertical slot 42
Third vertical slot 46
Fourth vertical slot 48
Outer wall of the vertical inner arm 49
First threaded bore 50
Second threaded bore 51
Third threaded bore 52
Fourth threaded bore 53
Fifth threaded bore 54
Sixth threaded bore 56
Seventh threaded bore 57
Eighth threaded bore 58
First high-load threaded track roller 60
Second high-load threaded track roller 61
Third high-load threaded track roller 62
Fourth high-load threaded track roller 63
Fifth high-load threaded track roller 64
Sixth high-load threaded track roller 65
Seventh high-load threaded track roller 66
eighth high-load threaded track roller 67
plenum 68
first or upper metal tube 70
second or lower metal tube 72 open end of the horizontal arm 74
angle plate for hoist mount 76
recess 78
second chain and hoist assembly 80
cable 82
drum 84
load hook 86
drive assembly 90
motor 91
first chain sprocket 92
sprocket chain 93
second chain sprocket 94
support arm 110
upper female hinge member 112
first recess 114
upper male hinge member 116
first extrusion 118
lower female hinge member 120
second recess 122
lower male hinge member 124
second extrusion 126
first pair of roller tracks or bearings 130
second pair of roller tracks or bearings 132
third pair of roller tracks or bearings 134
fourth pair of roller tracks or bearings 136

DETAILED DESCRIPTION OF THE INVENTION

Figure 3:
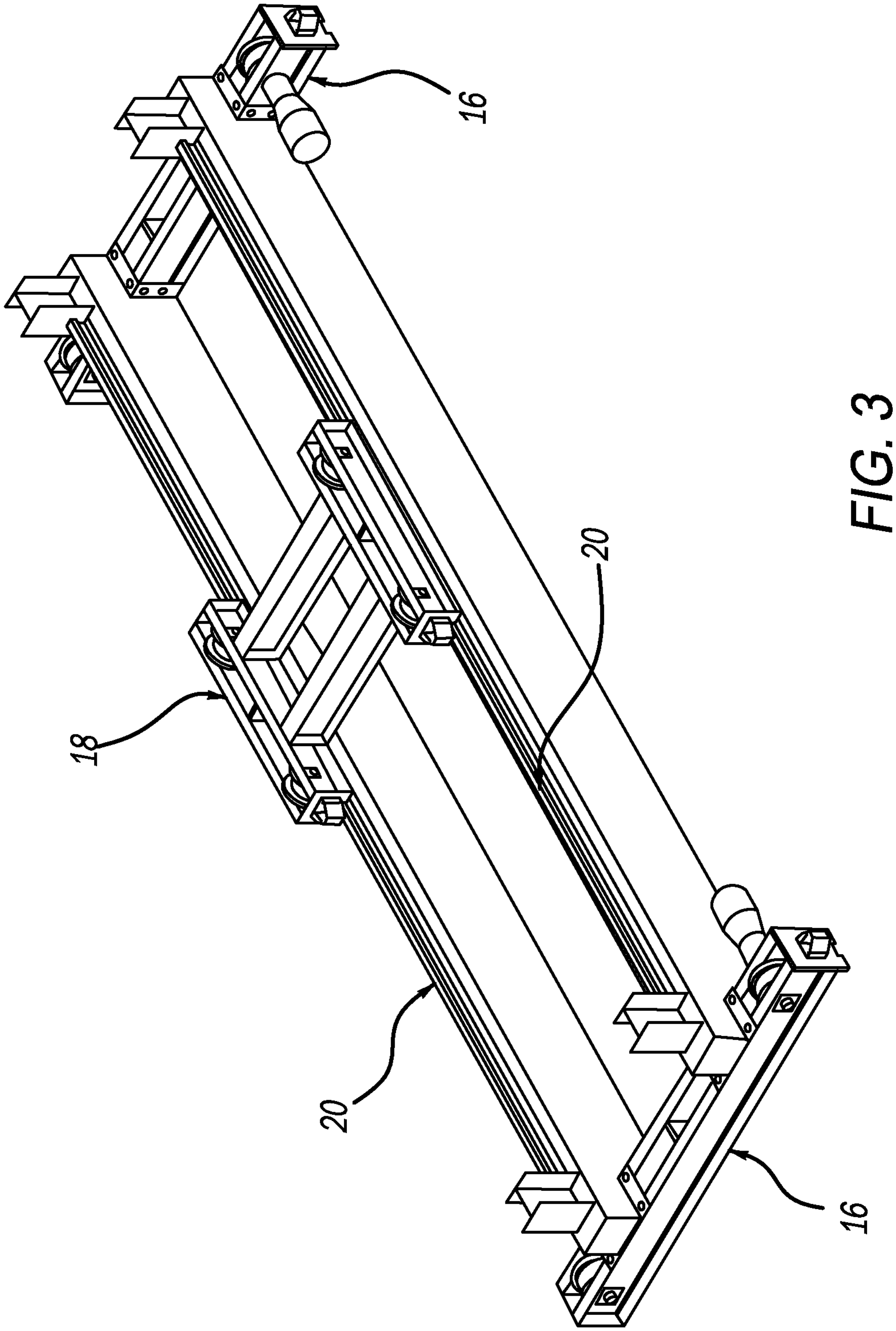
FIG. 3 is a perspective view of a trolley, truck, and girder assembly of the general crane assembly.
Figure 4:
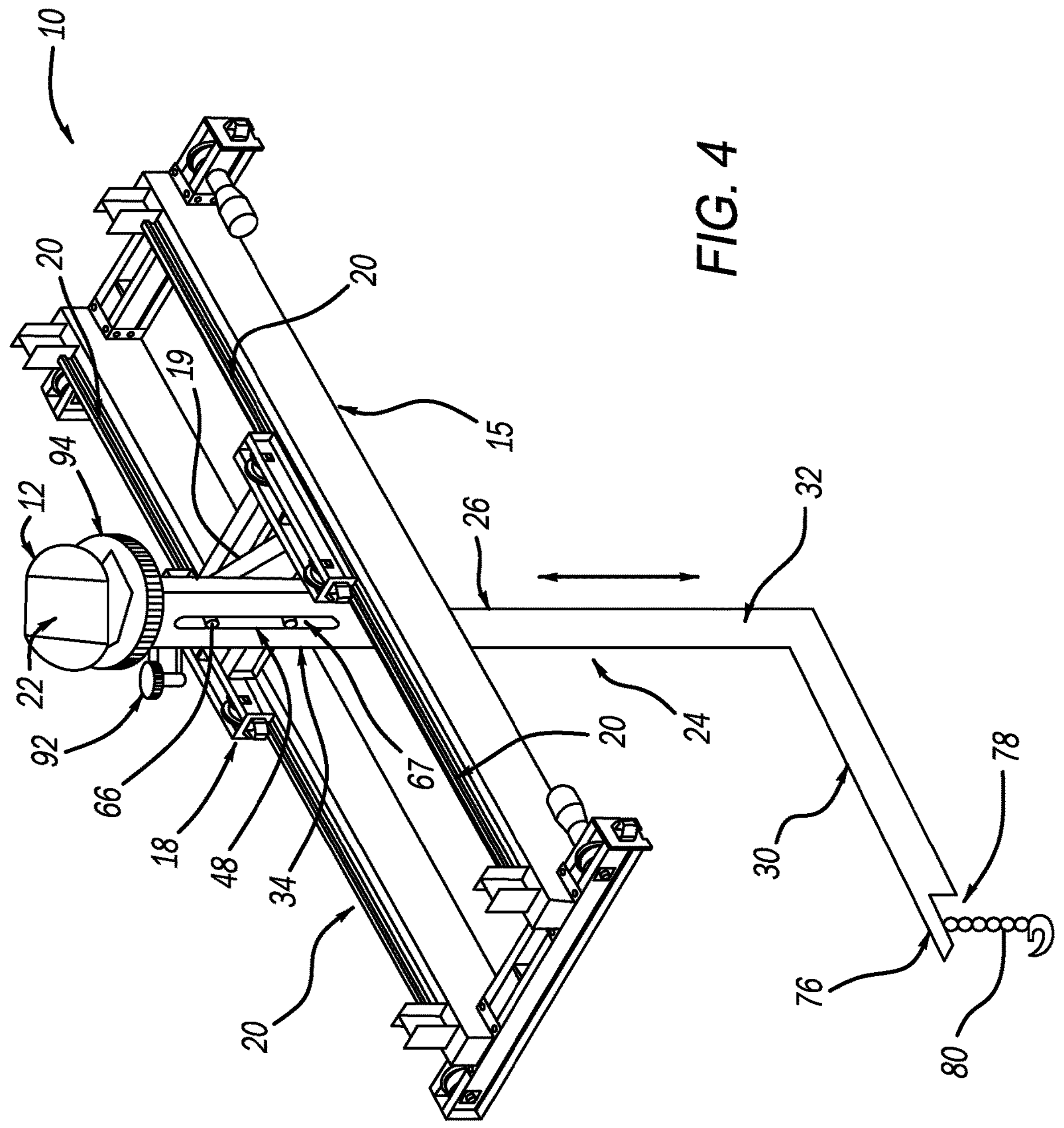
FIG. 4 is a perspective view of a crane assembly and boom assembly of the present invention.

In a first embodiment of the present invention as shown in FIG. 1, FIG. 3, and FIG. 4, a crane system 10 includes a hoist 12 containing a long-arm boom assembly 24 for extending the reach of the crane 10. The crane system 10 may be an overhead crane manufactured by a company such as the Crane Depot and installed in a known way. The crane system 10 may contain a truck 16 for support of a payload that would typically be lifted by the hoist 12. A trolley 18, as typically provided in an overhead crane 10, is operably connected to the truck 16. As shown in FIG. 3, a track or crane rail 20 is fixed to the bridge 15, whereby the trolley 18 during operation of the overhead crane 10, slidably or operably engages upon or within the track or crane rail 20.

In accordance with the present invention, a hoist and chain 22 vertically extends from the trolley 18 and is connected to and supports a boom assembly 24. A vertical inner arm 26 of the boom assembly 24 extends from and is connected to the hoist and chain 22 at a first end 28 of the vertical inner arm 26. A(n) angularly extending arm 30 may be integrated into the boom assembly 24 by welding with the vertical inner arm 26 at a second end 32 of the vertical inner arm 26, or the vertical inner arm and the angularly-extending arm 30 may be otherwise fixed to each other by strong fasteners and lugs or nuts and bolts (not shown), for example. Alternatively, a reinforcing plate 35 may be welded or otherwise fixed to the junction of the vertical inner arm end 32 and the closed end 37 of the horizontal arm 30 to thereby strengthen the union of the vertical and horizontal arms 26 and 30, respectively. The term “angular” and derivatives thereof, as used throughout this specification and appended claims is meant to convey an angle of extension ranging from 45 to 135 degrees, and more preferably, at an angle of about 90 degrees. With regard to the angularly-extending arm 30, a horizontally-extending arm 30 is preferred.

Figure 2:
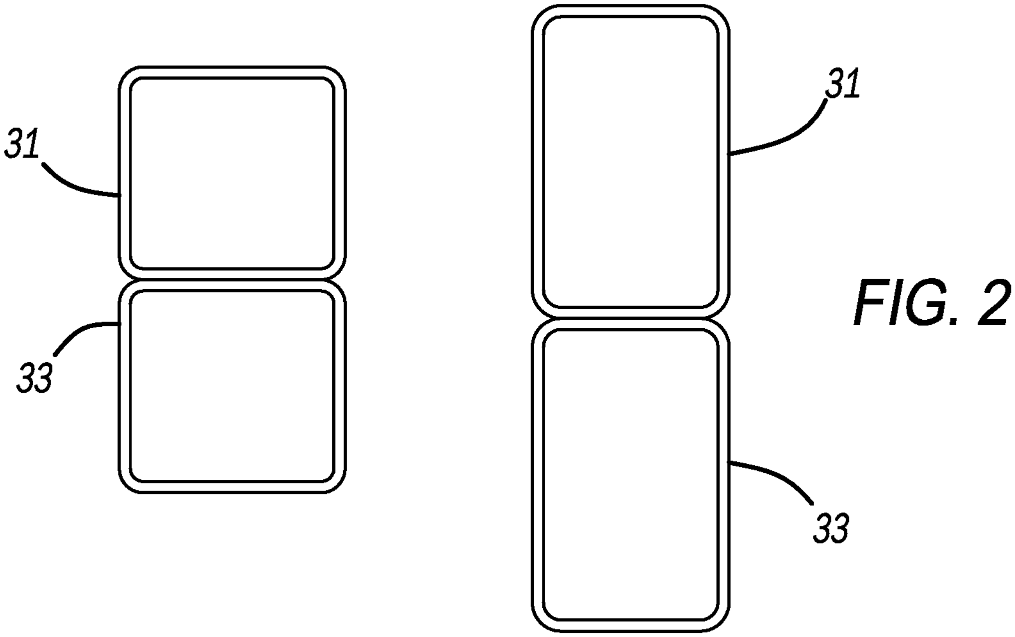
FIG. 2 is a cross-sectional view of the tubular laminates that form the angular arm.

As shown in FIG. 2, the angularly-extending arm 30 may be a horizontally-extending arm and may be formed by welding two elongated tubes 31 and 33 vertical juxtaposition to each other. In one embodiment, the tubes may be at least 10 feet long and formed by a cross-section defined by a rectangle measuring six inches by six inches; this embodiment may for example be designed for loads of no greater than 2000 pounds. In a second embodiment, the tubes 31 and 33 may be at least 20 feet long and formed by a cross-section defined by a rectangle measuring ten inches in height by six inches in width; this embodiment may for example be designed for loads of no greater than 2000 pounds. Stated another way, the cross section of each tube may in a preferred embodiment have a height to width ratio of 1:1 to 2:1. Further, in a preferred embodiment, each tube may have a length to height ratio of 20:1 to 24:1.

An outer sleeve 34 is fixed to the trolley 18 by attaching the outer sleeve 34 to a support beam 110 (as explained below), and extends about and is slidably engaged with the vertical inner arm 26. As shown in FIG. 4, for example, a single-arm system may be mounted on the side of the trolley 18, or, on the end of the trolley between the girders of the truck 16. In one single-arm embodiment as shown in FIG. 4, it is believed that a five-ton overhead crane or bridge is desirable for a one-arm trolley. As the trolley 18 moves across the bridge 15, see FIG. 3 and FIG. 5, the outer sleeve 34, connected to the hoist and chain 22 and the trolley 18 (as further explained below with regard to support beam 110), carries the boom or arm assembly 24. As described above, the hoist and chain 22 connected to the inner arm 26 extends through an orifice 36 at the top end of the outer sleeve 34 to its connection point on the vertical inner arm 26.

As shown in FIGS. 4, 7, 8, 9, 11, and 12, a first vertical slot 40 having a first length is formed along the length of the outer sleeve 34. A second vertical slot 42 having a second length is formed opposite to the first vertical slot 40 along the length of the outer sleeve 34. A third vertical slot 46 having a third length is formed along the length of the outer sleeve 34. A fourth vertical slot 48 having a fourth length is formed opposite to the third vertical slot 46 along the length of the outer sleeve 34. The vertical slots may all preferably be equal in length. Although the outer sleeve 34 preferably has a square cross-section, the geometry may be varied if desired. The vertical inner arm 26 may preferably have a similar cross-section to the outer sleeve 34, although the respective cross-section geometries may differ if desired.

Figure 7:
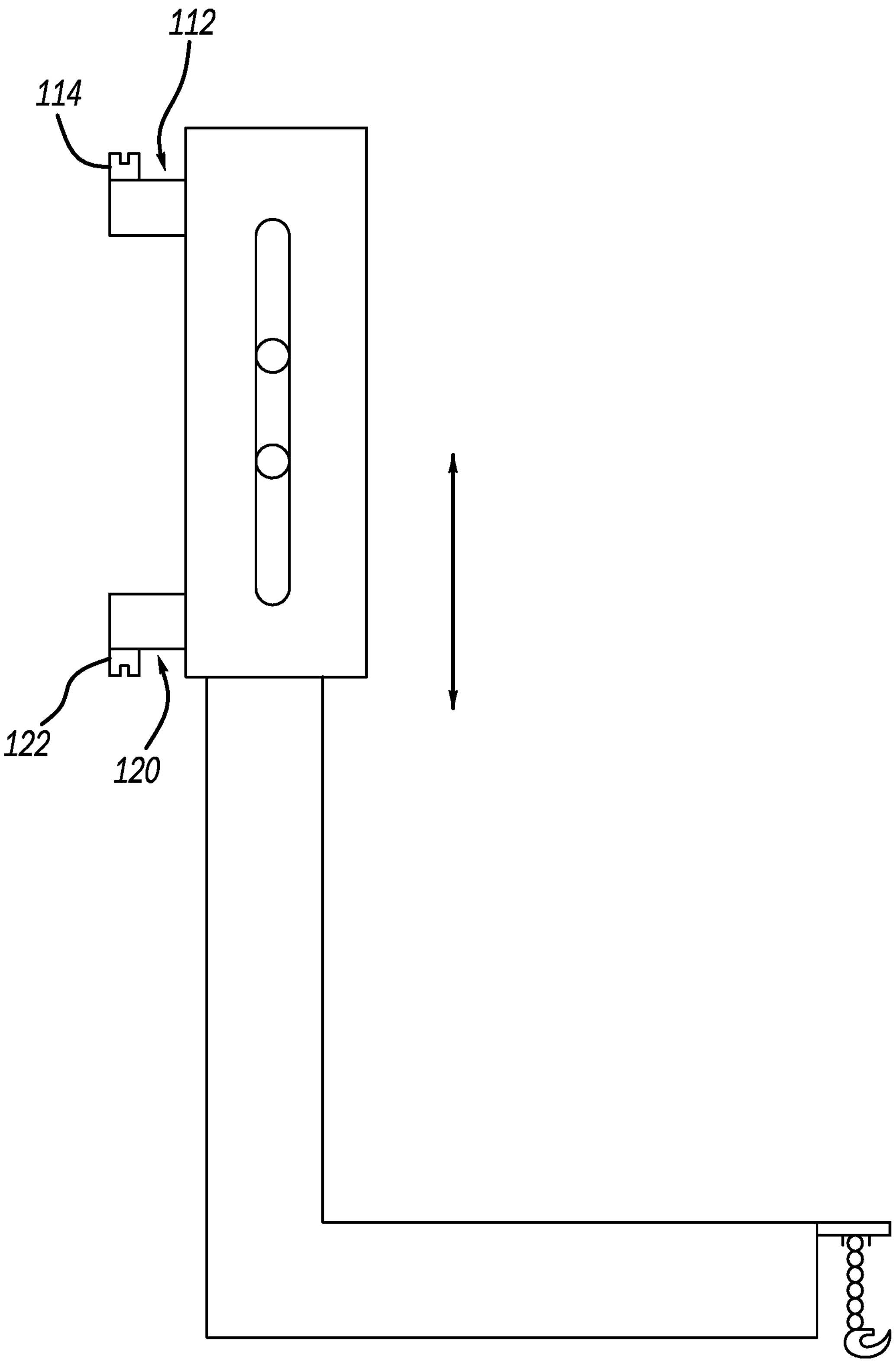
FIG. 7 is a side view of a boom assembly and the high stress roller guides interfacing with the outer sleeve.
Figure 8:
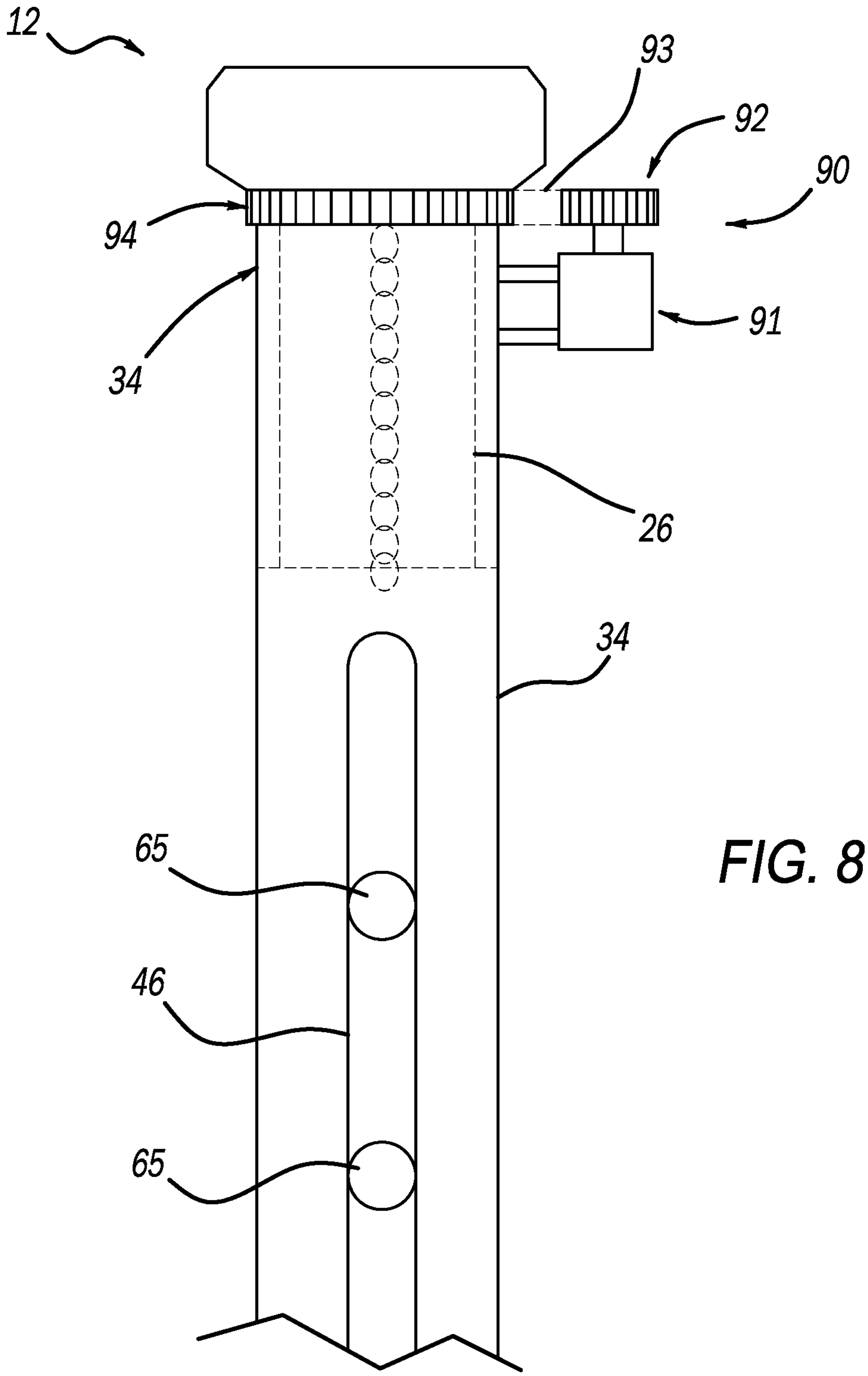
FIG. 8 is a front view of the motor and the chain-drive for rotation of the boom assembly.
Figure 9:
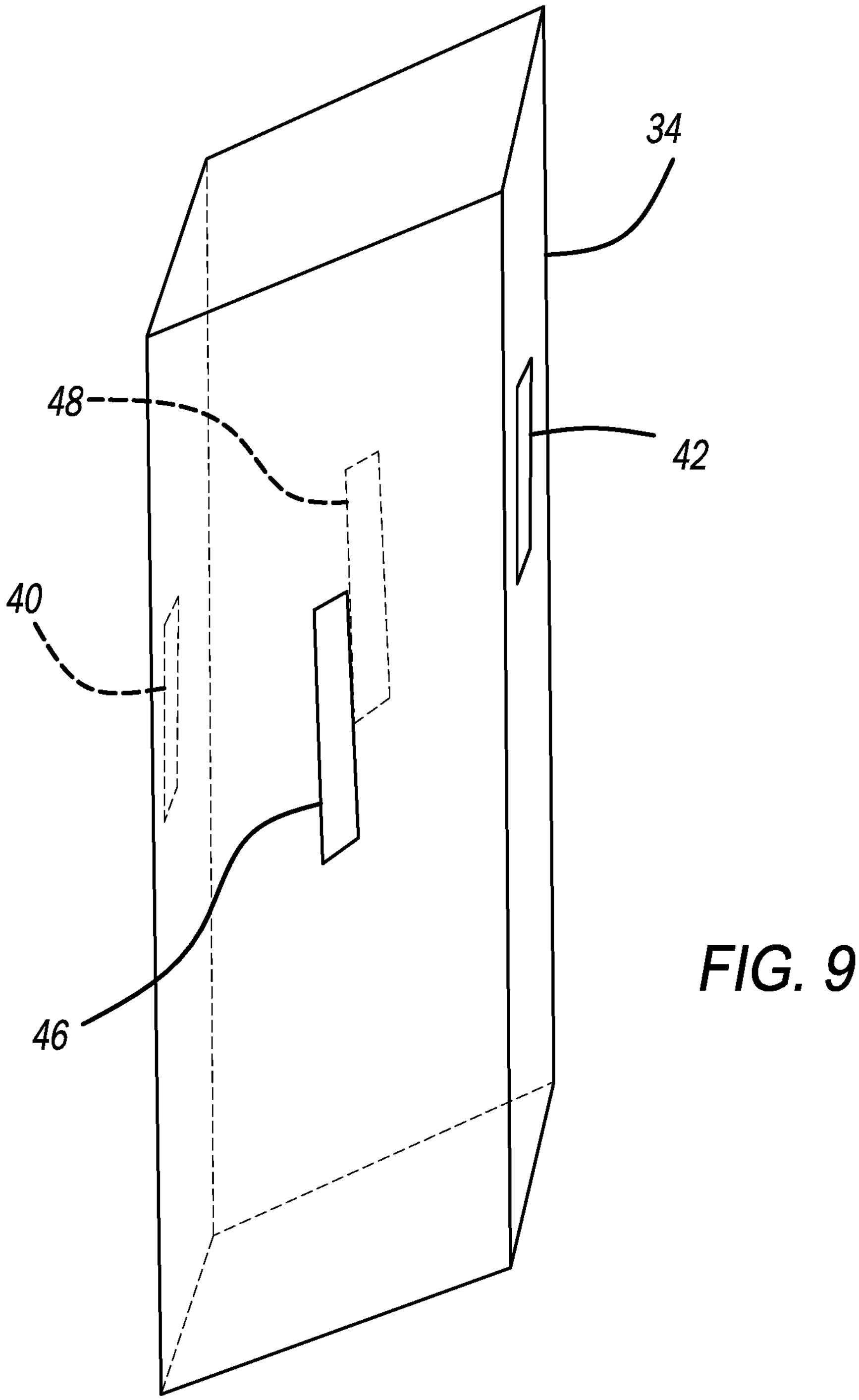
FIG. 9 is a perspective view of an outer sleeve containing drive slots opposed to each other.
Figure 10:
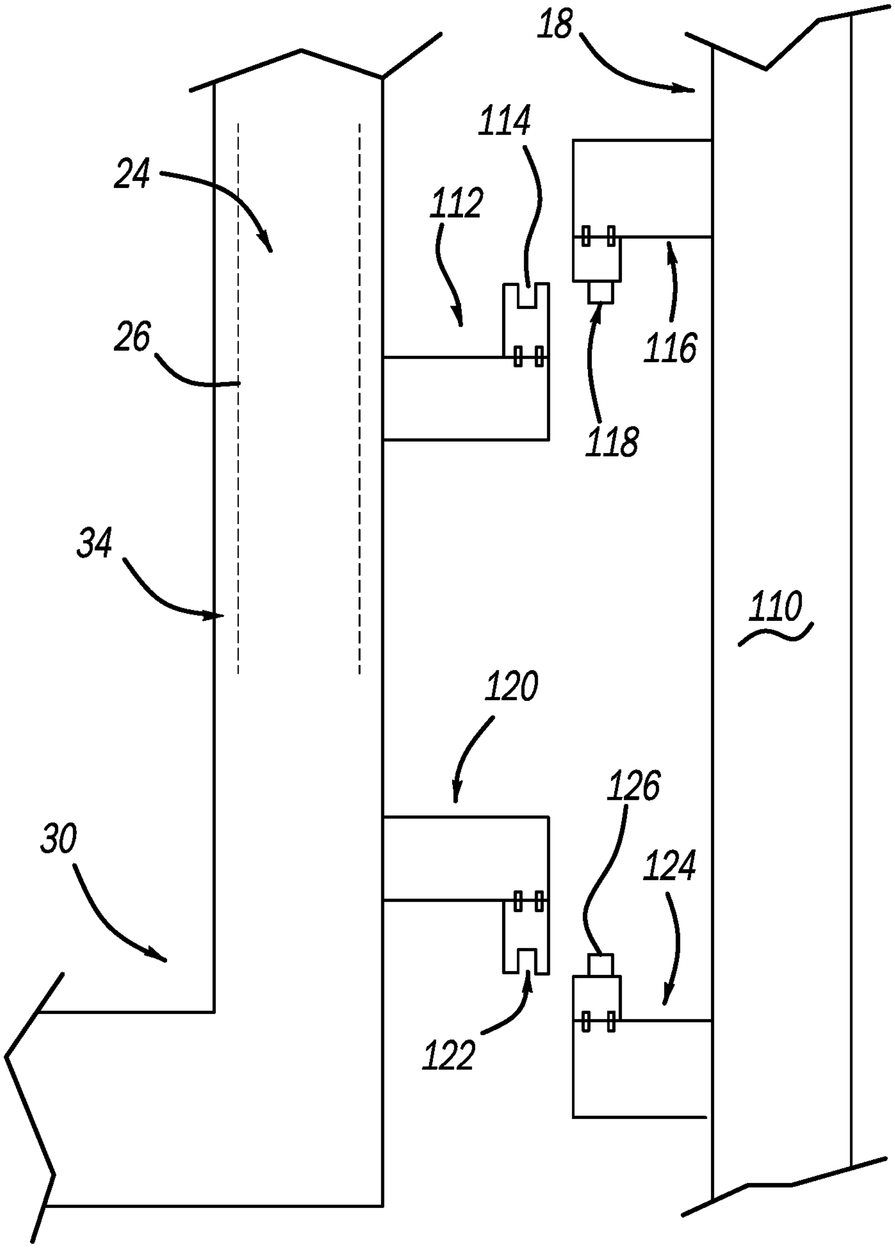
FIG. 10 is a side view of the hinged interface between the boom assembly and the support column.
Figure 11:
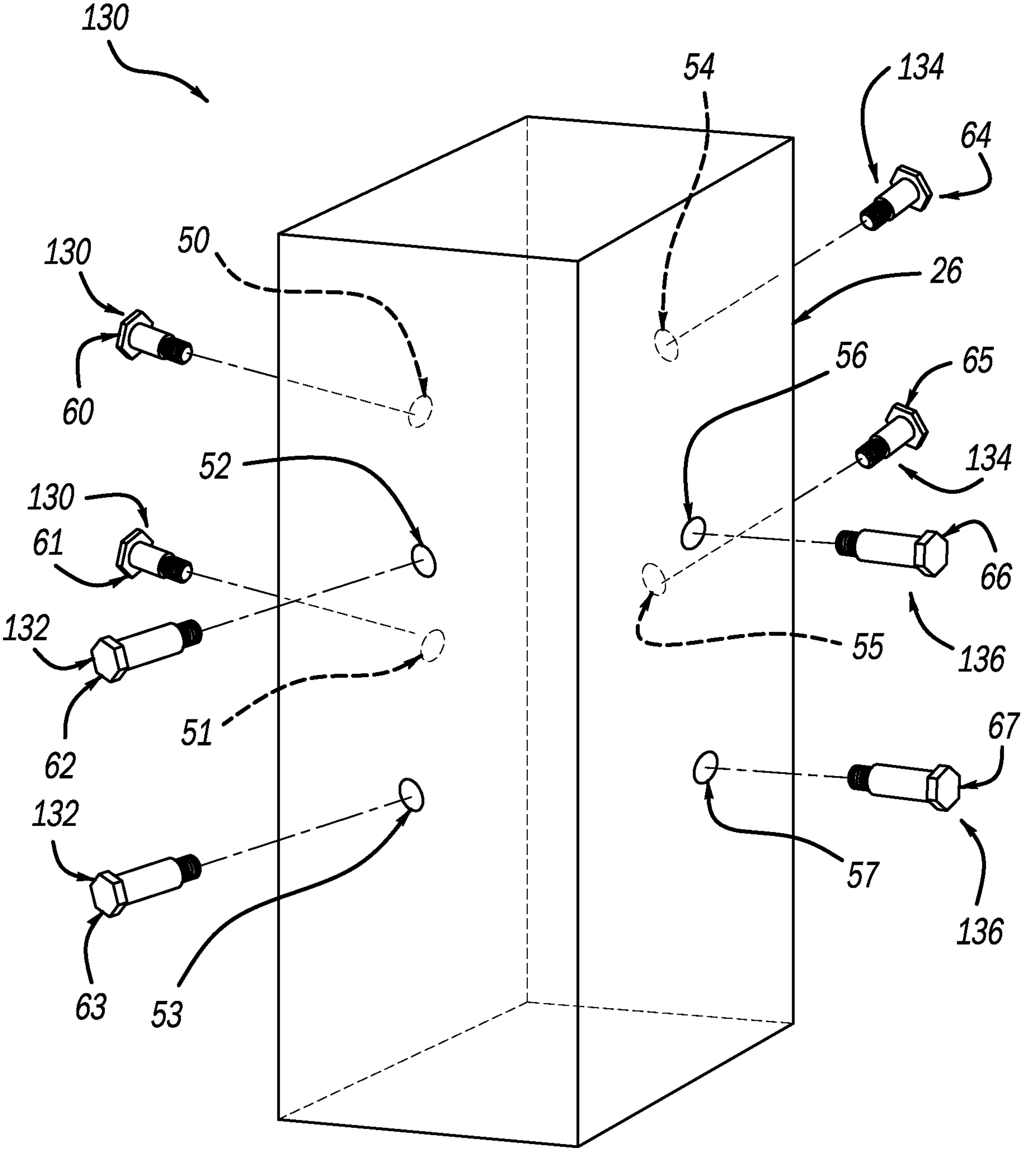
FIG. 11 is a perspective view of a vertical inner arm containing threaded bores.

As shown in FIGS. 7 and 12, a first threaded bore 50 is formed within the vertical inner arm 26 whereby the first threaded bore 50 is radially aligned with a portion of the first vertical slot 40. A second threaded bore 51 is formed within the vertical inner arm 26 whereby the second threaded bore 51 is radially aligned with a portion of the first vertical slot 40 and is also vertically aligned with the first threaded bore 50.

A third threaded bore 52 is formed within the vertical inner arm 26 whereby the third threaded bore 52 is radially aligned with a portion of the second vertical slot 42. A fourth threaded bore 53 is formed within the vertical inner arm 26 whereby the fourth threaded bore 53 is radially aligned with a portion of the second vertical slot 42 and is also vertically aligned with the third threaded bore 52.

A fifth threaded bore 54 is formed within the vertical inner arm 26 whereby the fifth threaded bore 54 is radially aligned with a portion of the third vertical slot 46. A sixth threaded bore 55 is formed within the vertical inner arm 26 whereby the sixth threaded bore 55 is radially aligned with a portion of the third vertical slot 46 and is also vertically aligned with the fifth threaded bore 54.

A seventh threaded bore 56 is formed within the vertical inner arm 26 whereby the seventh threaded bore 56 is radially aligned with a portion of the fourth vertical slot 48. An eighth threaded bore 57 is formed within the vertical inner arm 26 whereby the eighth threaded bore 57 is radially aligned with a portion of the fourth vertical slot 48 and is also vertically aligned with the seventh threaded bore 56.

As shown in FIGS. 4, 7, 8, and 11, a first high-load threaded track roller or bearing 60 manufactured by McMaster-Carr or some other suitable manufacturer, may be threadedly received by the first bore 50, and is then radially aligned to roll within the first slot 40 during operation of the crane 10. A second high-load threaded track roller or bearing 61 may be threadedly received by the second bore 51, and is vertically aligned with the first track bearing 60 and radially aligned to roll within the first slot 40, during operation of the crane 10. Accordingly, track rollers or bearings 60 and 61 constitute a first pair of roller tracks or bearings 130.

A third high-load threaded track roller or bearing 62 manufactured by McMaster-Carr or some other suitable manufacturer, may be threadedly received by the third bore 52, and is then radially aligned to roll within the second slot 42, during operation of the crane 10. A fourth high-load threaded track roller or bearing 63 may be threadedly received by the fourth bore 53, and is vertically aligned with the third track bearing 62 and radially aligned to roll within the second slot 42, during operation of the crane 10. Accordingly, track rollers or bearings 62 and 63 constitute a second pair of roller tracks or bearings 132.

A fifth high-load threaded track roller or bearing 64 manufactured by McMaster-Carr or some other suitable manufacturer, may be threadedly received by the fifth bore 54, and is then radially aligned to roll within the third slot 46, during operation of the crane 10. A sixth high-load threaded track roller or bearing 65 may be threadedly received by the fourth bore 55, and is vertically aligned with the fifth track bearing 64 and radially aligned to roll within the third slot 46, during operation of the crane 10. Accordingly, track rollers or bearings 64 and 65 constitute a third pair of roller tracks or bearings 134.

A seventh high-load threaded track roller or bearing 66 manufactured by McMaster-Carr or some other suitable manufacturer, may be threadedly received by the seventh bore 56, and is then radially aligned to roll within the fourth slot 48, during operation of the crane 10. An eighth high-load threaded track roller or bearing 67 may be threadedly received by the fourth bore 57, and is vertically aligned with the seventh track bearing 66 and radially aligned to roll within the third slot 46, during operation of the crane 10. Accordingly, track rollers or bearings 66 and 67 constitute a fourth pair of roller tracks or bearings 136.

In accordance with one aspect of the present invention, the plurality of high-load threaded track rollers or bearings, when installed within the respective plurality of bores and when riding within the respective plurality of slots, create a space or plenum 68 defined between the inner wall 38 of the outer sleeve 34, and, the outer wall 49 of the vertical inner arm 26. As such, the support provided by this configuration results in a stabilized movement of the payload whereby the haphazard movement of the payload is minimized by virtue of the track rollers or bearings supported within the respective slots.

In another aspect of the present invention, and as shown in FIG. 2, the horizontal arm 30 may be formed with a first or upper metal tube 31 vertically juxtaposed with a second or lower metal tube 33, fixed below the first metal tube 70. By laminating or welding the upper metal tube 31 to the lower metal tube 33, the strength of the horizontal arm 30 is substantially increased. In one embodiment, the cross-section of the first and second metal tubes 31 and 33 may be rectangular in shape.

An open end 74 of the horizontal arm 30 contains an angle plate 76 at the end of the first metal tube 31, for strengthening the attachment of the hoist assembly 80 as indicated below. The elongated section 76 extends beyond the length of the second metal tube 72, thereby defining a recess 78 beneath the angle plate 76. A second chain and hoist assembly 80 is fixed to the horizontal arm 30 at the open end 74, and more specifically, is attached to the angle plate 76. As shown in FIGS. 4 and 7, the second chain and hoist assembly 80 includes a chain or cable 82 coiled about a reel or pulley 84. The reel or pulley 84 may be electronically or manually controlled. A load hook 86 may be fixed to a lower end 88 of the chain or cable 82, for clasping and securing a crate, package, window, door, or other object to be lifted. Stated another way, the load hook 86 may couple the chain and hoist assembly 80 to an object to be lifted from the bed of a truck or vessel, for example. In one embodiment, after the load hook 86 is connected to an object such as a crate, the crate may be vertically lifted as the cable 82 is raised and recoiled about the drum 84. Once the crate is suspended from the chain and hoist assembly 80, the crane assembly 10 may then be employed to move the crate to a predetermined location in the manufacturing facility or warehouse. When not in use, the chain and hoist assembly 80 may be retracted and compactly stored within the recess 78.

Figure 5:
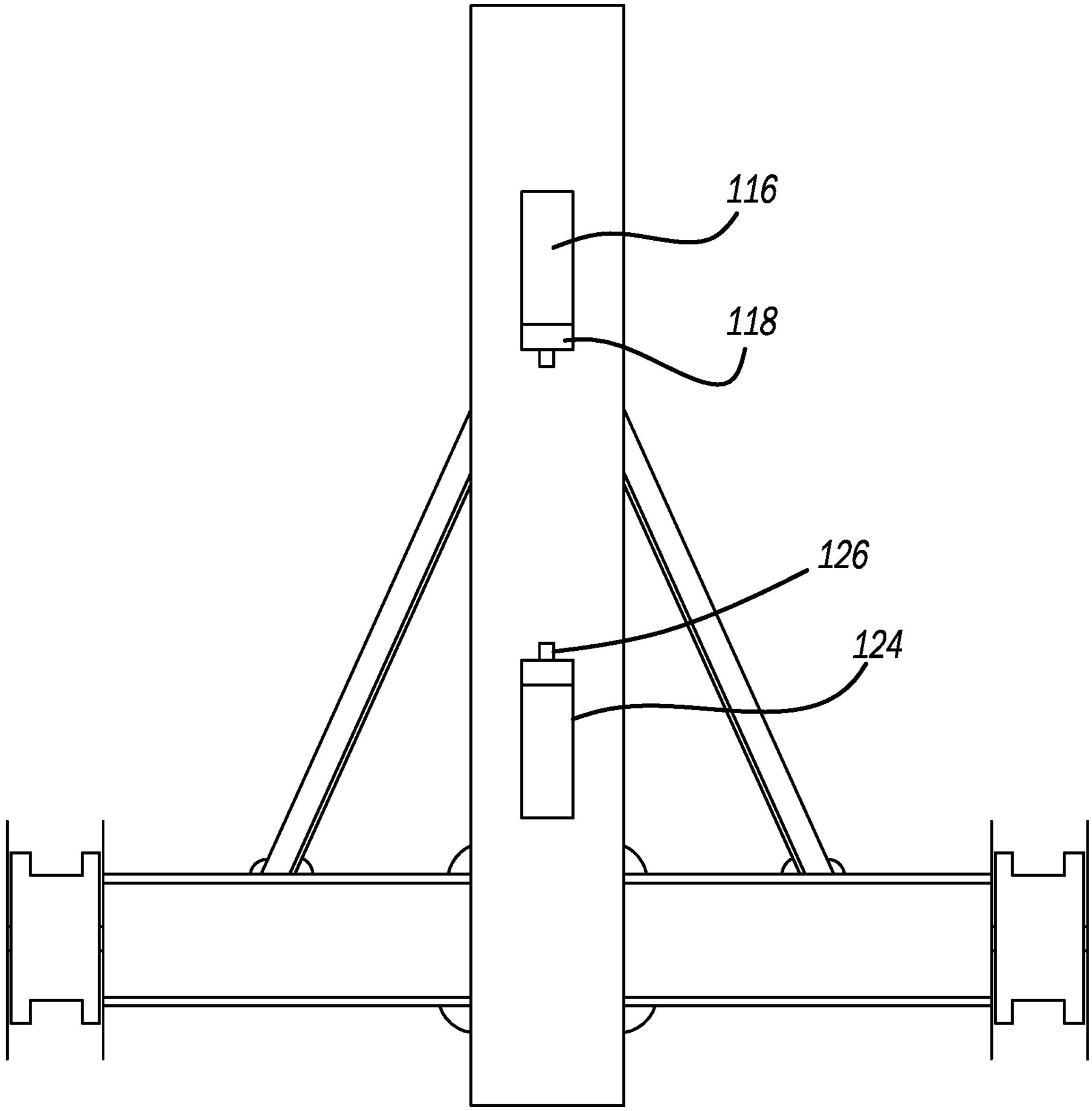
FIG. 5 is a front view of a boom assembly operably connected to the trolley.
Figure 6:
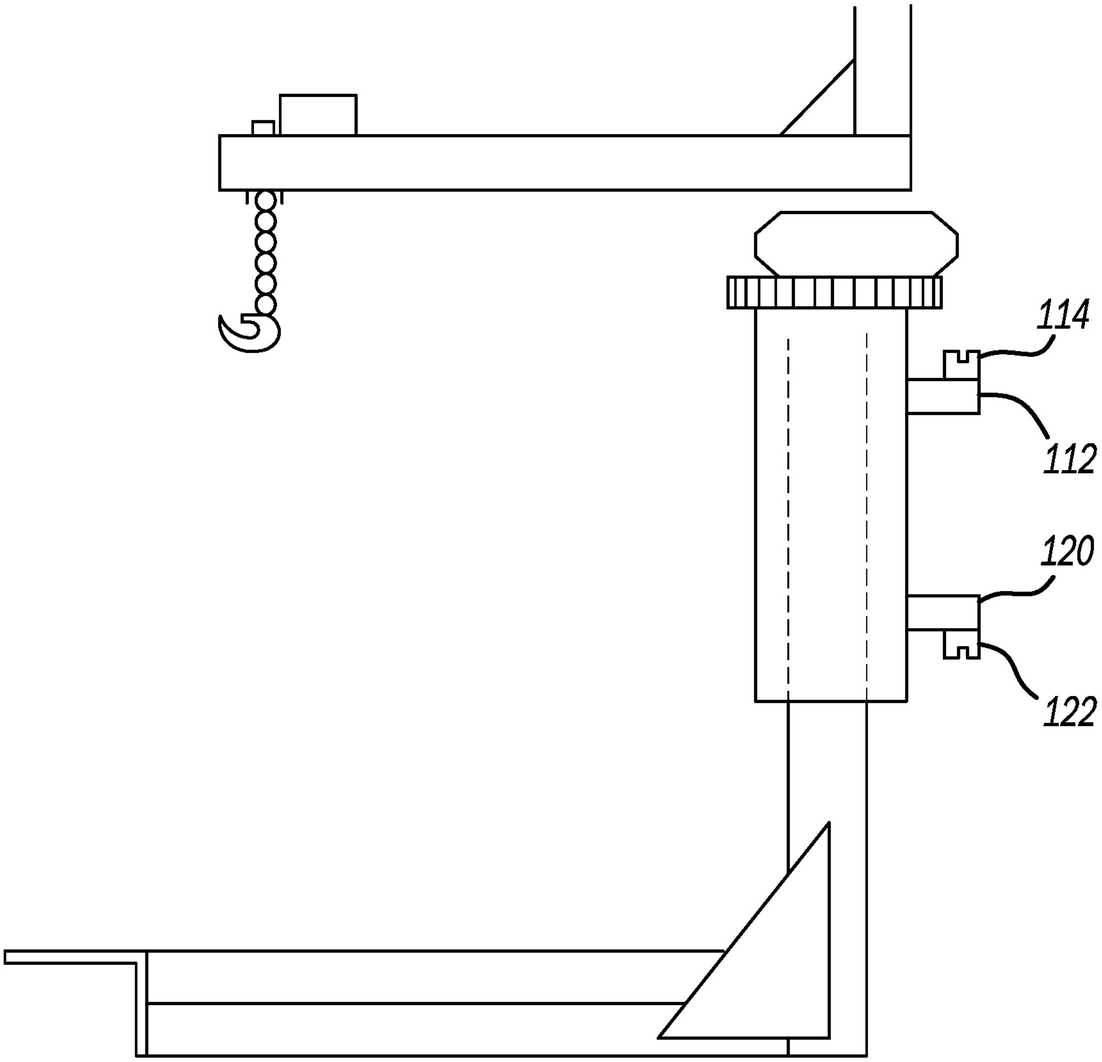
FIG. 6 is a side view of a hoist and a boom assembly of the present invention.

As known in the art, and as schematically shown in FIG. 5, an optional and exemplary load hook 86 may also form the hoist assembly 80 and may include a swivel hook assembly with a latch for clasping an object to be moved. The load hook 86, when connected to the object or payload of the crane assembly 10, may be securely moved by securing the load hook 86 to the payload in a known manner.

In yet another aspect of the invention, the boom or arm assembly 24 may be pivoted about a range of 180 degrees. The pivotal range of motion of the boom or arm assembly 24, in addition to the movement provided by the truck 16 and trolley 18, provides great flexibility in optimizing the efficiency of storage space throughout the facility. Accordingly, a drive assembly 90 is mounted on a support beam 110 or elsewhere on the crane system 10. An exemplary drive assembly 90, but not by way of limitation, may contain a motor 91 that actuates a first chain sprocket 92 operably connected to a second chain sprocket 94. In one embodiment, the motor 90 and the first chain sprocket 92 may be fixed to the support column 110. The second chain sprocket may be fixed to the boom assembly 24, or more specifically, to the outer sleeve 34. When the motor 90 is actuated, the first sprocket 92 rotates to in turn drive a sprocket chain 93 operably connecting the first sprocket 92 to the second chain sprocket 94. As the sprocket chain 93 rotates the first and second sprockets 92 and 94, the outer sleeve 34 connected to the vertical inner arm 26 may thereby be rotated about a 180-degree range of motion. Because the outer sleeve 34 is connected to the boom 34, the boom or arm assembly 24 also rotates as the outer sleeve 34 is rotated.

In yet another aspect of the invention, and as shown in FIGS. 1, 4, 5, 10, and 11, the crane assembly 10 may contain a support arm 110 that is vertically juxtaposed to the inner vertical arm 26. The support arm 110 may be fixed to the trolley 18, for support of the boom assembly 24. The outer sleeve 34 may be rotatably connected to the fixed support arm 110. Stated another way, as shown in FIG. 5, the support beam 110 may be welded or otherwise fixed to a cross member(s) and/or gussets 19 of the trolley 18, and to the trolley 18. An upper female hinge member 112 contains a first recess 114 and is fixed to the outer sleeve 34. An upper male hinge member 116 is fixed to the support arm 110 and contains a first extrusion 118, and is fixed above the female hinge member 112 to the support arm 110. Upon assembly, the female hinge member 112 receives the male hinge member 116, whereby the first recess 114 receives the first extrusion 118 for slidable and rotary engagement of the first extrusion 118 therein. In the same way, a lower female hinge member 120 contains a second recess 122 and is fixed to the outer sleeve 34. A lower male hinge member 124 contains a second extrusion 126 and is fixed to the support arm 110, beneath the lower female hinge member 120. Upon assembly, the female hinge member 120 receives the male hinge member 124, whereby the second recess 122 receives the second extrusion 126 for slidable and rotary engagement of the second extrusion 126 therein. It will be appreciated that in a preferred embodiment, the first extrusion 118 and the second extrusion 126 extend toward each other and are seated within the first recess 114 and the second recess 122 (which face outboard or opposite to each other), respectively, such that the first extrusion 118 and the second extrusion 126 seated within the recesses 114 and 122, respectively are inversely oriented toward each other, or, stated another way, mirror images of each other.

Any force operating downwardly upon the lower male hinge member 124 by the second recess 122 is thereby limited or managed by the concurrent retention force applied by the first extrusion 118 against the first recess 114. Conversely, any force operating upwardly upon the upper male hinge member 116 by the first recess 114 is thereby limited or managed by the concurrent retention force applied by the lower male hinge member 124 as it is retained in the second recess 122.

In operation, as the chain driven rotor 94 is actuated to rotate the boom 24 and the outer sleeve 34 from 0.1 to 180 degrees, the outer sleeve 34 and the boom assembly 24 is thereby rotated about the support beam 110. The addition of the support beam 110 to the crane assembly 110 permits a load increase of 100 to 150%. For example, in one embodiment, the inner vertical arm 26 may support up to 3000 pounds of weight. However, when the support arm 110 is added to augment the strength of the boom assembly 24, the load may be at least 3000 pounds. It will be appreciated that the upper and lower movement of the boom 24 is limited by the limits provided by the upper crane and trolley assembly.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A boom for an overhead crane and trolley comprising:

an arm having a first vertical portion fixed to said crane for upper and lower movement of said arm, said arm containing a second portion angularly extending from said vertical portion;

a first pair of track bearings comprising—a first track bearing fixed to said arm, and, a second track bearing fixed to said arm, said second track bearing vertically spaced from said first track bearing;

a second pair of track bearings comprising—a third track bearing fixed to said arm, and, a fourth track bearing fixed to said arm, said fourth track bearing vertically spaced from said third track bearing;

a third pair of track bearings comprising—a fifth track bearing angularly fixed to said arm, and, a sixth track bearing fixed to said arm, said sixth track bearing vertically spaced from said fifth track bearing;

a fourth pair of track bearings comprising—a seventh track bearing fixed to said arm, and, an eighth track bearing fixed to said arm, said eighth track bearing vertically spaced from said seventh track bearing;

an outer sleeve fixed to said trolley and extending about said arm; and a first linear slot, a second linear slot, a third linear slot, and a fourth linear slot, each slot formed within and spaced about said outer sleeve, said first, second, third, and fourth pairs of track bearings operably tracked within said first, second, third, and fourth slots, respectively, wherein during operation, said arm is adapted to be slidably engaged within said outer sleeve.

2. The boom of claim 1, further comprising a uniform plenum defined between an inner wall of said outer sleeve and an outer wall of said vertical inner arm.

3. The boom of claim 1, wherein said angularly extending arm is formed from a first tube fixed and vertically juxtaposed to a second tube.

4. The boom of claim 3, wherein a cross section of each tube has a height to width ratio of 1:1 to 2:1.

5. The boom of claim 3, wherein each tube has a length to height ratio of 20:1 to 24:1.

6. The boom of claim 3, wherein said first tube has an extended portion that extends in length beyond the length of the second tube, whereby a hoist assembly is fixed adjacent to the extended portion of the first tube for hoisting a payload thereon.

7. The boom of claim 1, further comprising a support beam fixed to said trolley, wherein said support beam is hingedly connected to the outer sleeve, said support beam further comprising a drive assembly operably connected to the outer sleeve for rotating the outer sleeve and boom about the support beam.

8. The boom of claim 7, wherein said drive assembly comprises a chain-driven sprocket assembly actuated by a driver mounted to said support beam.

9. The boom of claim 8, wherein said driver is a motor containing a first sprocket, and said chain-driven sprocket assembly comprises a second sprocket fixed to said outer sleeve and a chain operably connecting said first and second sprockets, whereby when said motor is actuated said first sprocket drives said second sprocket to rotate said outer sleeve and boom about said support beam.

10. The boom of claim 7, wherein said boom is rotatable from 0.1 to 180 degrees.

11. A crane assembly comprising the boom of claim 1.

12. The boom of claim 11, further comprising a support beam fixed to said trolley, said support beam hingedly connected to the outer sleeve, and further comprising a drive assembly connected to the outer sleeve for rotating the boom about the support beam.

13. The boom of claim 11, further comprising a support beam, said support beam comprising an upper male hinge member with a first extrusion and a lower male hinge member with a second extrusion, said first and second extrusions protruding toward each other, and, said outer sleeve further comprising an upper female hinge member with a first recess and a lower female hinge member with a second recess, said first and second recess facing outboard of each other, wherein said first extrusion and said second extrusion rotatably and operably mate within said first recess and said second recess, respectively, for rotation of said boom about said support beam.

14. The boom of claim 11, wherein said angularly-extending arm comprises a first tube fixed and vertically juxtaposed to a second tube, each of said first and second tubes comprising a closed end and an open end.

15. The boom of claim 14, comprising a hoist assembly fixed proximate to said open ends of said first and second tubes.

16. A boom for an overhead crane and trolley comprising:
- an arm having a first vertical portion fixed to said crane for upper and lower movement of said arm, said arm containing a second portion angularly extending from said vertical portion;
- a first pair of vertically aligned roller track bearings fixed to said arm;
- a second pair of vertically aligned roller track bearings fixed to said arm;
- a third pair of vertically aligned roller track bearings fixed to said arm;
- a fourth pair of vertically aligned roller track bearings fixed to said arm;
- an outer sleeve fixed to said trolley and extending about said arm; and
- a first slot, a second slot, a third slot, and a fourth slot, each slot formed within and spaced about said outer sleeve, said first, second, third, and fourth pairs of roller track bearings operably tracked within said first, second, third, and fourth slots, respectively,
- wherein during operation, said arm is adapted to be slidably engaged within said outer sleeve.

17. The boom of claim 16, wherein said drive assembly comprises a chain-driven sprocket assembly comprising:
- a motor mounted on said boom;
- a first sprocket operably connected to said motor;
- a second sprocket fixed to an upper portion of said outer sleeve; and
- a chain connecting said first and second sprocket,
- whereby when said motor is actuated said first sprocket drives said chain to drive said second sprocket and thereby rotate said outer sleeve about said support beam.

18. A boom for an overhead crane and trolley comprising:
- an arm having a first vertical portion and an outer surface, said arm fixed to said crane for upper and lower movement of said arm, said arm containing a second portion angularly extending from said vertical portion; and
- an outer sleeve containing an inner wall, said outer sleeve fixed to said trolley and extending about said arm, wherein the outer surface of said arm is adapted to be at least substantially equidistant from the inner wall of said outer sleeve, thereby forming a substantially uniform plenum or annulus about the arm between the inner wall and the outer surface;
- wherein during operation, said arm is adapted to be slidably engaged within said outer sleeve.

19. The boom of claim 18, further comprising a support beam fixed to said trolley, said support beam hingedly connected to the outer sleeve, and further comprising a drive assembly connected to the outer sleeve for rotating the boom about the support beam.

20. A crane assembly comprising the boom of claim 18.

* * * * *